3,026,204
STABILIZATION OF MALT BEVERAGES
Forest A. Hoglan, Glenview, Ill., assignor to International Minerals & Chemical Corporation, a corporation of New York
No Drawing. Filed Feb. 6, 1959, Ser. No. 791,544
4 Claims. (Cl. 99—48)

The present invention relates to the stabilization of malt beverages, and more particularly to the improvement of the foam stability and storage stability of beer, ale, and the like.

A pleasing characteristic of beer and similar beverages is their property of producing a light and voluminous foam when dispensed, and it is important that at least a portion of the foam be retained on the surface of the beverage until the latter has been completely consumed.

Another important characteristic of beer and similar beverages is their brilliantly clear, sparkling, amber appearance, which must be preserved during storage and until the time of consumption. The development of haze in the beer during storage or upon chilling is a problem which has been the subject of careful study for many years.

A further property for which beer, ale, and the like are highly prized is their clean, characteristic flavor. This flavor is highly sensitive to oxidation, e.g., by air, which is ordinarily present in the packaged product, and much effort has been expended to prevent or overcome the effects of oxidizing agents during the storage of the beverages. For this purpose, various substances have been added to the beverages, especially those having antioxidant properties, including ascorbic acid, L-glutamic acid, and the like, and derivatives thereof. While these substances do effect some degree of improvement, they are not entirely satisfactory, owing to the fact that they produce undesirable and objectionable flavor effects when employed at the necessary concentrations.

The present invention has for its primary objects the improvement of malt beverages with respect to their foam stability, their freedom from haze, and their stability with respect to taste. Other objects will be apparent from the following description.

It has now been discovered that malt beverages are markedly improved in the foregoing respects without adverse effect upon their flavor characteristics by incorporating therein a quantity of D-glutamate—viz., D-glutamic acid, an edible inorganic acid salt of D-glutamic acid, or an edible metallic D-glutamate salt. Preferred additives are D-glutamic acid, monosodium D-glutamate, or a mixture thereof which produces a pH in aqueous solution approximating the normal pH of the malt beverage. Other suitable salts include D-glutamic acid hydrochloride, D-glutamic acid phosphate, D-glutamic acid sulfate, monopotassium D-glutamate, and other alkali-metal D-glutamates, monocalcium D-diglutamate, and other alkaline-earth metal D-glutamates, and the like. The inorganic acid salts of D-glutamic acid and the metallic D-glutamate salts are broadly useful in the invention, so long as they are edible.

The proportion of D-glutamate should be at least about 200 p.p.m., calculated as monosodium D-glutamate, in order to produce the desired result. In the range of about 200 to 1000 p.p.m., the desired effect is obtained without recognizable change in the flavor of the malt beverage. For this reason, the range of about 200 to 1000 p.p.m. is distinctly preferred. At about 1000 p.p.m., a slight flavor, characteristic of the D-glutamate ion, becomes noticeable. This flavor, however, is not obtrusive and is not particularly objectionable; hence, the D-glutamate can be used in considerably higher proportions if desired for any reason without impairing the quality of the product. It is possible, for example, to use up to about 1% by weight, calculated as monosodium D-glutamate to prolong the shelf life and to produce foam stability of a high order. Generally speaking, however, such a level is not necessary, and a level of about 2000 p.p.m. is generally the maximum that should be employed.

When D-glutamate is added to a malt beverage in the foregoing proportions, the beverage generally has a foam stability, after storage, considerably better than the level attained in the absence of D-glutamate; it maintains the sparkle and color of the beverage essentially in their original conditions; and it prevents the formation of haze when the beverage, after storage, is cooled to the temperature desired for drinking.

The mechanism whereby the present invention achieves its results has not been ascertained. The improvement in foam stability presumably arises out of some modification of the surface tension of the liquid. The improvement in oxidizing stability may be due to a chelating action by the D-glutamate on trace metals which catalyze the formation of off-odor and/or off-taste. The prevention of haze formation may be similarly related to an antioxidant effect, although this is by no means certain. In every case, the use of glutamate in the D-form is distinctly advantageous, in that it permits the use of a markedly higher proportion of active material without producing an objectionable glutamate after-taste, which would materially alter the flavor of the product.

The invention is applicable to malt beverages in general, including the various types of beer and ale.

The added D-glutamic acid material can conveniently be incorporated in the beverage at any time in its manufacture, beginning with the brewing process, up to the eventual bottling of the beverage for consumption. D-glutamate is not metabolized or otherwise altered or destroyed by the brewing operation itself; but it would tend to be lost to some small degree with the fermentation solids. Hence, it is preferred to add the D-glutamate to the beverage after the filtration and clarification thereof. For greatest and most sustained effect, the D-glutamate should be added immediately after the final filtration, so that the liquid is protected continuously during handling and storage.

The invention will be more fully understood from the following specific example.

*Example*

Beer, after being brewed in the usual way, is subjected to a conventional "chillproofing" treatment by treatment with a proteolytic enzyme, and is then clarified by filtration through cellulose pulp. To the clarified beer is added a saturated aqueous solution of monosodium D-glutamate in a proportion sufficient to produce a concentration of 200 parts per million of the added salt. After thorough mixing, the beer is bottled, capped, and pasteurized. The completed product retains its original flavor and foam stability during prolonged storage.

While the foregoing description and example refer to certain specific embodiments and aspects of the invention, it is to be understood that such embodiments and aspects are given by way of illustrating the invention, and with no intent of restricting the invention thereto. It will be apparent that numerous modifications and equivalents of the invention will readily occur to those skilled in the art from the foregoing description.

The following claims particularly point out and distinctly claim the invention:

1. A method for improving the foam and flavor stability of beers and ales during storage which comprises adding thereto at least about 200 p.p.m. of D-glutamic acid values, calculated as monosodium D-glutamate.

2. A method for improving the storage stability of beers and ales which comprises adding thereto between about 200 and about 1000 p.p.m. of an edible monometallic salt of D-glutamic acid wherein said metal is an alkali metal.

3. A method for improving the storage characteristics of beers and ales which comprises adding thereto between about 200 and about 1000 p.p.m. of monosodium D-glutamate.

4. A method for improving the foam stability and oxidative stability of beers and ales which comprises adding thereto D-glutamic acid and a monometallic salt of D-glutamic acid wherein said metal is an alkali metal, the proportion being such as to have a pH substantially equal to that of the original beer or ale, the proportion of added material between about 200 and about 1000 p.p.m.

References Cited in the file of this patent

UNITED STATES PATENTS

| | | |
|---|---|---|
| 1,015,891 | Ikeda et al. | Jan. 30, 1912 |
| 1,035,591 | Ikeda et al. | Aug. 13, 1912 |
| 2,590,647 | Pettibone | Mar. 25, 1952 |
| 2,692,199 | Weber | Oct. 19, 1954 |
| 2,806,791 | Frieden et al. | Sept. 17, 1957 |

OTHER REFERENCES

Text "The Chemical Senses," by R. W. Moncrief, pub. by Leonard Hill Lmtd., London, 1944, page 270.